US008848507B2

(12) United States Patent
Bakshi

(10) Patent No.: US 8,848,507 B2
(45) Date of Patent: Sep. 30, 2014

(54) METHOD AND SYSTEM FOR DISCOVERING ISOLATED NETWORK FRAGMENTS

(75) Inventor: Yury Bakshi, Morganville, NJ (US)

(73) Assignee: AT&T Intellectual Property I, LP, Altanta, GA (US)

( * ) Notice: Subject to any disclaimer, the term of this patent is extended or adjusted under 35 U.S.C. 154(b) by 544 days.

(21) Appl. No.: 12/339,602

(22) Filed: Dec. 19, 2008

(65) Prior Publication Data
US 2010/0157842 A1   Jun. 24, 2010

(51) Int. Cl.
*H04L 12/26* (2006.01)
*H04L 12/46* (2006.01)

(52) U.S. Cl.
CPC .................................. *H04L 12/4616* (2013.01)
USPC ......................................................... 370/216

(58) Field of Classification Search
None
See application file for complete search history.

(56) References Cited

U.S. PATENT DOCUMENTS

| | | | |
|---|---|---|---|
| 5,568,605 A | 10/1996 | Clouston et al. | |
| 5,732,086 A * | 3/1998 | Liang et al. | 370/410 |
| 5,799,153 A | 8/1998 | Blau et al. | |
| 7,266,473 B1 | 9/2007 | Kanevsky et al. | |
| 7,289,456 B2 * | 10/2007 | Gupta et al. | 370/254 |
| 8,014,378 B1 * | 9/2011 | Yoon et al. | 370/350 |
| 2004/0139371 A1 * | 7/2004 | Wilson et al. | 714/43 |
| 2004/0221041 A1 * | 11/2004 | Tabbara | 709/227 |
| 2006/0095961 A1 * | 5/2006 | Govindarajan et al. | 726/15 |
| 2007/0140267 A1 * | 6/2007 | Yang | 370/401 |
| 2008/0212961 A1 * | 9/2008 | Zhang | 398/25 |

* cited by examiner

*Primary Examiner* — Chirag Shah
*Assistant Examiner* — Amar Persaud
(74) *Attorney, Agent, or Firm* — Fay Kaplun & Marcin, LLP

(57) ABSTRACT

A computer readable storage medium includes a set of instructions executable by a processor. The instructions are operable to receive a node indication for each of a plurality of undamaged backbone nodes of a communication network; receive a link indication for each of a plurality of backbone links connected between undamaged backbone nodes of the communication network; and assign a fragment identifier to each of a plurality of backbone fragments, each of the backbone fragments comprising one or more of the backbone nodes, wherein the one or more backbone nodes comprising each backbone fragment indicates connectivity between the one or more backbone nodes.

17 Claims, 4 Drawing Sheets

METHOD AND SYSTEM FOR DISCOVERING ISOLATED NETWORK FRAGMENTS

BACKGROUND

Modern telecommunications networks typically comprise complicated, interconnected networks of nodes and links. Network providers strive to provide service to their customers both during normal operations and during situations when the network is damaged, either moderately or severely. In order to insure that service can be provided in situations when a network is damaged, providers may use modeling algorithms to analyze various possible failure scenarios. Because networks with large numbers of nodes and links may have a correspondingly large number of failure scenarios, such modeling algorithms should be as simple as possible in order for them to execute quickly and thus be able to model complicated systems in a reasonable amount of time.

SUMMARY OF THE INVENTION

The present invention is directed to a computer readable storage medium including a set of instructions executable by a processor. The instructions are operable to receive a node indication for each of a plurality of undamaged backbone nodes of a communication network; receive a link indication for each of a plurality of backbone links connected between undamaged backbone nodes of the communication network; and assign a fragment identifier to each of a plurality of backbone fragments, each of the backbone fragments comprising one or more of the backbone nodes, wherein the one or more backbone nodes comprising each backbone fragment indicates connectivity between the one or more backbone nodes.

The present invention is further directed to a system including a memory and a processor. The memory stores a representation of a plurality of network components, the network components including backbone components. The processor is configured to receive a fragmentation of the network components and to assign one of a plurality of unique identifiers to each of a plurality of fragments of the backbone corresponding to the fragmentation.

The present invention is further directed to a computer readable storage medium including a set of instructions executable by a processor. The instructions are operable to receive a node indicator for each of a plurality of backbone nodes of a communication network; receive a link indicator for each of a plurality of backbone links of a communication network, wherein the backbone links connect two or more backbone nodes; receive a damage indication of one or more of the backbone nodes; and assign a fragment identifier to each of one or more undamaged backbone nodes in backbone fragments, each backbone fragment comprising undamaged backbone nodes that are connected, directly or indirectly, by backbone links.

DETAILED DESCRIPTION

Figure 1A:
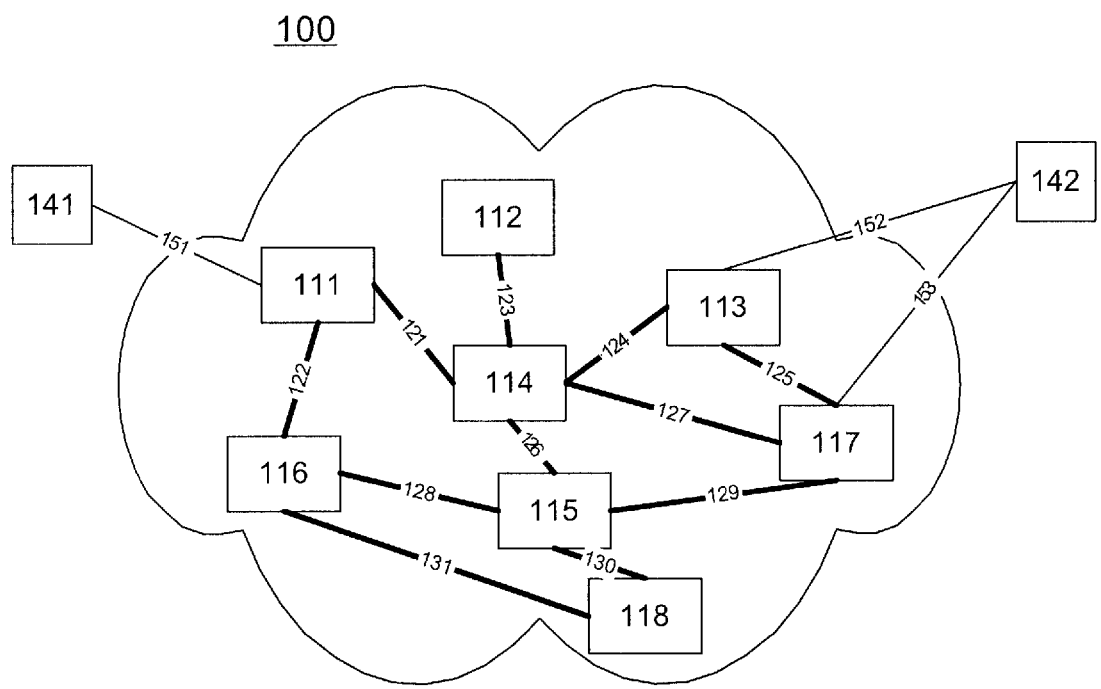
FIG. 1a shows an exemplary communications network that may be modeled by the exemplary embodiments of the present invention.

The exemplary embodiments of the present invention may be further understood with reference to the following description and the appended drawings, wherein like elements are referred to with the same reference numerals. The exemplary embodiments describe methods and systems for modeling connectivity between multiple end points attached to a network that is subjected to multiple failures.

It should initially be noted that the exemplary embodiments will be described with reference to a Voice over Internet Protocol ("VoIP") network. Thus, the specific end points described and analyzed in the description of the exemplary embodiments will be those appropriate to this type of network. However, the exemplary methods and systems may be equally applicable to any other type of problem involving a need to validate connectivity between multiple end points attached to a common network or other type of graph.

Providers of communication networks employ various modeling techniques to evaluate network survivability under a variety of hypothetical damage/outage scenarios. The total number of scenarios that must be analyzed is often extremely large. For example, in a network with 25 nodes and 100 links, there are over 10,000,000 different combinations involving the failure of one, two, three or four links or nodes; the total number of multiple failure scenarios is over $4.25 \times 10^{37}$. Further, for each scenario, the connectivity between a large number of equipment pairs must be analyzed. For example, in a network with 1,000 users, an assessment of connectivity between all user pairs requires analysis of roughly 1,000,000 pairs of users. Additionally, more complex call flows, which may involve network validation, routing, and service processing equipment, require connectivity analysis for an even larger number of pairs of end points. Thus, it is extremely important to enhance the speed of the modeling of such networks. Faster modeling may enable more failure scenarios to be analyzed, resulting in more accurate survivability evaluations.

FIG. 1a illustrates an exemplary communication network 100 in an undamaged state. As stated above, the exemplary network 100 is a VoIP network. The elements described herein will therefore be those appropriate to this type of network, but as stated above, the broader principles of the invention may be equally applicable to other types of networks. The network 100 includes eight backbone nodes 111, 112, 113, 114, 115, 116, 117 and 118. These nodes may be, for example, backbone routers. The backbone nodes 111-118 are connected to one another by eleven backbone links 121, 122, 123, 124, 125, 126, 127, 128, 129, 130 and 131, shown on FIG. 1a as thick solid lines. These may be, for example, high-capacity trunk data links.

The exemplary network 100 also includes two user nodes 141 and 142, which may represent various types of user equipment capable of connecting to the network 100, such as a computer with VoIP software. Those of skill in the art will understand that the precise number and relationship of the various components shown in the network 100 of FIG. 1a is only exemplary, and that the number, relationship and function of components and links in other networks may be significantly greater than shown and may vary from network to network. Further, those of skill in the art will understand that a real-world VoIP implementation may include processing nodes, routing nodes, etc., but that these are not shown in FIGS. 1a and 1b as they are not relevant to the exemplary method to be described below.

Typically, a VoIP call may require connectivity to different network nodes. A call placed by a first user to a second user may require that the first user connect to a routing node, then to a processing node, and finally directly to the second user. For clarity, FIG. 1a only illustrates user nodes 141 and 142. These nodes may be, for example, private branch exchanges ("PBX"). The user node 141 is connected to the network 100 via access link 151, which connects it to backbone node 111; the user node 142 is connected to the network 100 via access links 152 and 153, which connect it to backbone nodes 113 and 117 respectively. The access links 151-153 may typically have lower capacity than the backbone links 121-131. The access links are illustrated in FIG. 1a as thin solid lines.

It will be apparent to one of skill in the art that a properly designed network that has suffered no damage or outage, as illustrated in FIG. 1a, will provide for all necessary connectivity. In this example, the user node 141 may connect to the user node 142 via access link 151, backbone node ill, backbone link 121, backbone node 114, backbone link 124, backbone node 113 and access link 152. Generally, networks such as the network 100 are designed to withstand single node or link failure without significant performance degradation. Thus, connectivity is generally available in such a case. For example, in the event of a single outage of backbone node 114, a connection between users 141 and 142 could still be accomplished via backbone nodes 111, 116, 115 and 117.

However, as discussed above, a main goal of the exemplary embodiments is to model situations where a network has suffered damage or outage. Those of skill in the art will understand that damage may be due to natural disasters (e.g., hurricanes, earthquakes, etc.), due to manmade disasters (e.g., steam pipe explosions, acts of war, etc.), or due to network-related outages (e.g., software failure, power failure, etc.). The exemplary embodiments described herein may discover all backbone fragments that may have been isolated from one another due to such damage. Backbone fragmentation may then cause a loss of connectivity between, for example, user nodes within a network. Referring to the network 100, as long as user nodes 141 and 142 are connected to at least one common backbone fragment, they are thus connected to one another, and may communicate with one another through the backbone network (e.g., nodes 111-118 and links 121-131). If, however, the nodes 141 and 142 are connected to different fragments (e.g., there is no common backbone fragment shared by the two), they are then rendered unable to communicate with one another by the modeled damage scenario. Thus, discovering isolated network fragments is an important part of modeling network survivability.

Figure 1B:
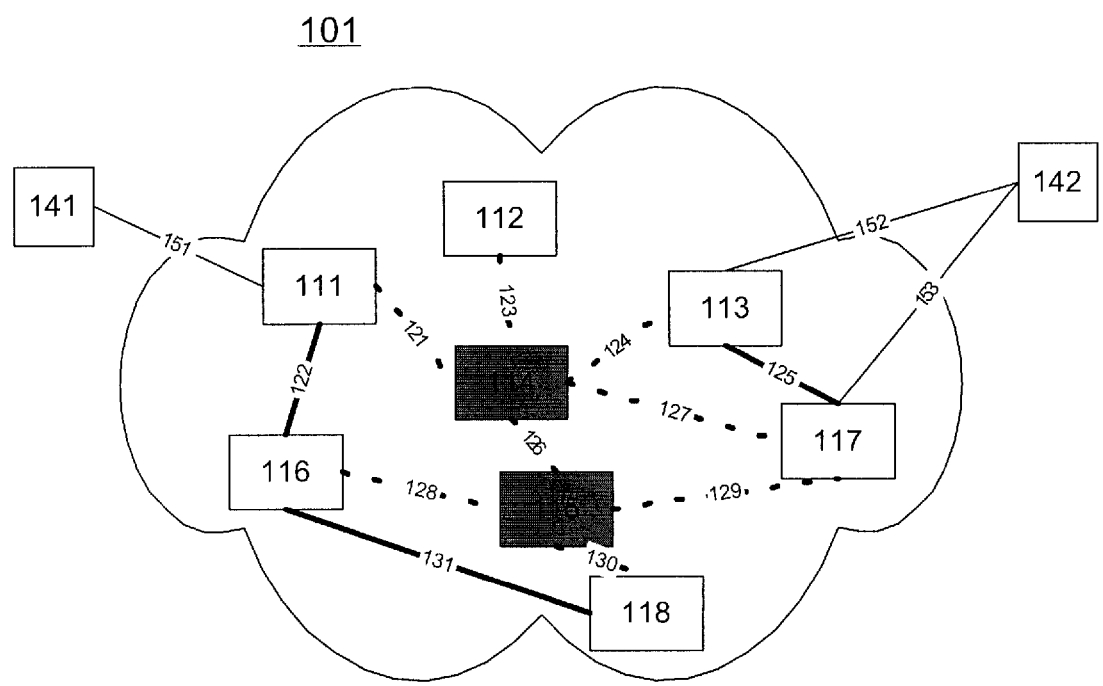
FIG. 1b shows the exemplary network of FIG. 1a while experiencing an exemplary failure scenario, which will be used to illustrate the operation of the exemplary embodiments of the present invention.

FIG. 1b illustrates damaged network 101, which is network 100 in a damaged state. In damaged network 101, backbone nodes 114 and 115 have suffered damage and are unavailable to handle network traffic. FIG. 1b illustrates damaged nodes 114 and 115 grayed out and the links that connect to those nodes (e.g., backbone links 121, 123, 124, 126, 127, 128, 129 and 130) as dashed lines.

Figure 2:
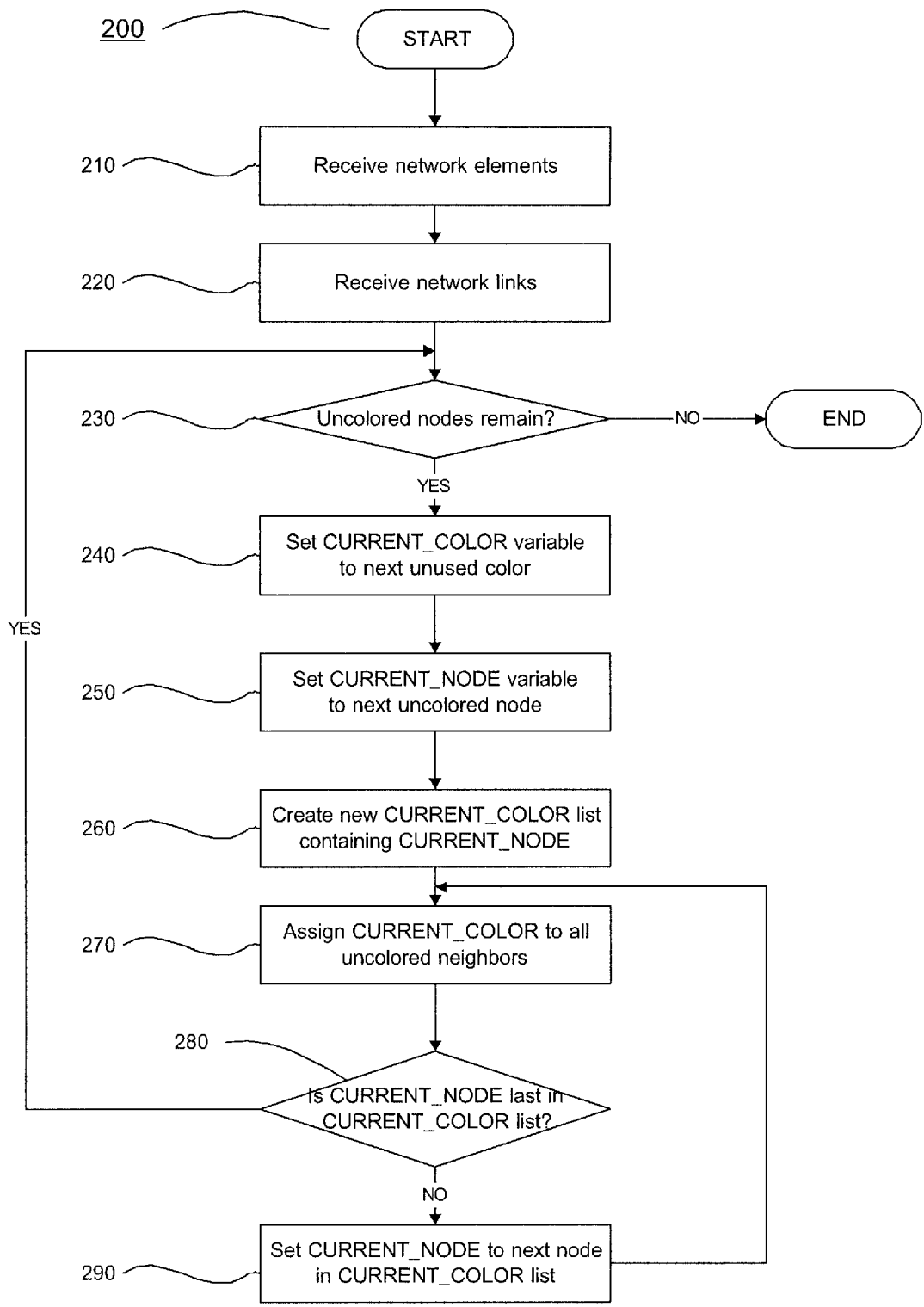
FIG. 2 shows an exemplary embodiment of a method according to the present invention.

FIG. 2 illustrates an exemplary method 200 according to the present invention. The method 200 will be described with reference to the damaged network 101 of FIG. 1b. Those of skill in the art will understand that the method 200 represents the evaluation of a single network failure scenario, and that a real-world implementation of the method 200 will repeat as a plurality of possible failure scenarios are evaluated. In the exemplary method 200, each fragment of the damaged network 101 is assigned a unique identifier. The method 200 describes an embodiment wherein the unique identifiers are colors, which may be preferable for a graphical representation of the fragmented network; however, those of skill in the art will understand that the unique identifiers may also be numbers, letters, words, place designations, network component designations, etc., or any other type of identifier that may be used to distinguish the various isolated backbone fragments from one another.

Figure 3A:
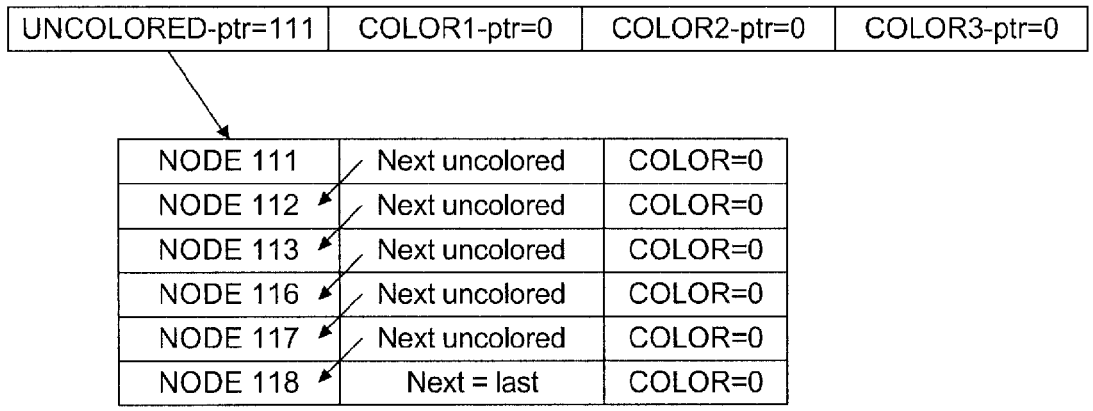
FIG. 3a shows a first version of an array of nodes to be generated by the exemplary method of FIG. 2.

In step 210, the network elements (e.g., nodes) are received. These may be stored into an array with a size N equal to the number of nodes in the scenario to be analyzed. It should be noted that only functioning nodes are received in this step (e.g., in the damaged network 101, nodes 111, 112, 113, 116, 117 and 118, but not nodes 115 and 116). The array may initially include a pointer from the array name to the first node and from each node to the next node. FIG. 3a illustrates an exemplary initial array 300 for the damaged network 101 described above.

Figure 3B:
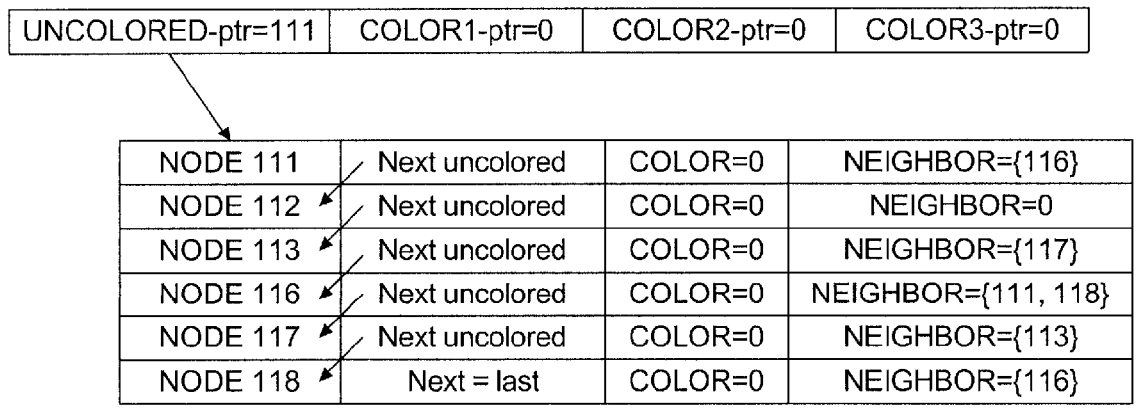
FIG. 3b shows a second version of an array of nodes to be generated by the exemplary method of FIG. 2.

In step 220, the network links are received and processed. For a link between two nodes A and B, the array entry for node A will reflect that node B is its neighbor, and vice versa. As for step 210, only functioning links are received in step 220. FIG. 3b illustrates exemplary linked array 301, which is the array 300 of FIG. 3a with neighboring nodes added.

In step 230, the method determines whether any uncolored nodes remain. If so, the method continues to step 240. If all nodes have been colored, the method terminates. In step 240, the next unused color is selected. For example, when the method begins, as no colors have been used, COLOR1 is the first unused color. For example, COLOR1 may be yellow.

In steps 250 and 260, the first node that has not yet been assigned a color is removed from the uncolored list and added to the list for the currently selected color. The selected node is marked with the appropriate color in the node array. Additionally, in step 270 all uncolored neighbors of the selected node are assigned the selected color. For example, if the selected node is ill and the selected color is yellow, then node 111 and node 116 will be assigned the color yellow. Also in step 270, all newly colored nodes are removed from the uncolored node list and appended to the end of the current color node list. Pointers are updated to reflect the new first uncolored node, the first node of the current color, and any subsequent nodes of the current color. Subsequently, in the loop including steps 270-290, all uncolored neighbors of the remaining entries in the group are assigned the current color. Pointers are again updated. Those of skill in the art will understand these steps may continue to repeat as long as new nodes are added to the group. Continuing with the above example, node 118 is assigned the color yellow in this step as it is a neighbor of step 116.

Once it is determined, in step 280, that the current node is the last in the list (e.g., no more neighboring nodes have been assigned the current color), the method returns to step 230, where it is again determined whether there are uncolored nodes remaining. If so, the method returns to step 240 and continues with the next color, to be assigned to the next fragment of the network. If no uncolored nodes remain, the method terminates.

Figure 3C:
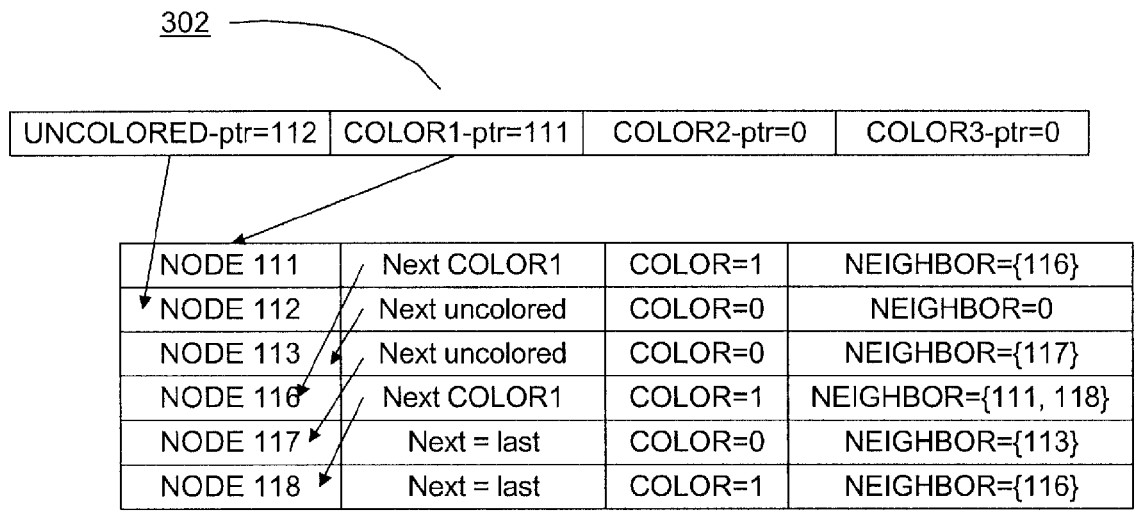
FIG. 3c shows a third version of an array of nodes to be generated by the exemplary method of FIG. 2.

The application of the method 200 to the damaged network 101 may proceed as follows. In steps 210 and 220, the survived nodes (111, 112, 113, 116, 117 and 118) and links (122, 125, 131) are received, resulting in the node array as illustrated in FIG. 3b. In step 240, the first color COLOR1 (e.g., yellow) is selected for assignment. In steps 250 and 260, the first uncolored node 111 is assigned the first color COLOR1. In step 270, node 116, a neighbor of node 111, is also assigned COLOR1. Next, in steps 280 and 290, the method continues with the analysis of the neighbors of node 116. In step 270, COLOR1 is assigned to node 118, as it is a neighbor of node 116. FIG. 3c illustrates array 302, which is the array 300 at this point in the exemplary application of the method. At this point, the discovery of the first (e.g., "yellow") network fragment is completed. Nodes 111, 116 and 118 have been assigned COLOR1; nodes 112, 113 and 117 remain uncolored. The uncolored pointer is to node 112, the first uncolored node, and subsequently to nodes 113 and 117; the COLOR1 pointer is to node 111, and subsequently to nodes 116 and 118.

Continuing with the exemplary application of the method 200, after step 280 the method returns to step 230, in which it is determined that uncolored nodes remain in the uncolored node list. Thus, the method progresses to step 240, where COLOR2 (e.g., green) is selected. In step 260, COLOR2 is assigned to the first remaining uncolored node, node 112. The COLOR2 pointer is assigned to node 112, and the uncolored pointer is assigned to node 113, the new first remaining uncolored node. No additional nodes are assigned COLOR2 in step 270, as node 112 borders no other functioning nodes. At this point, the discovery of the second (e.g., "green") network fragment is completed. In step 280, the method determines that the current node 112 is the last in the COLOR2 list, so it returns to step 230, in which it is again determined that uncolored nodes remain, so the method again proceeds to step 240 to discover the next network fragment.

Figure 3D:
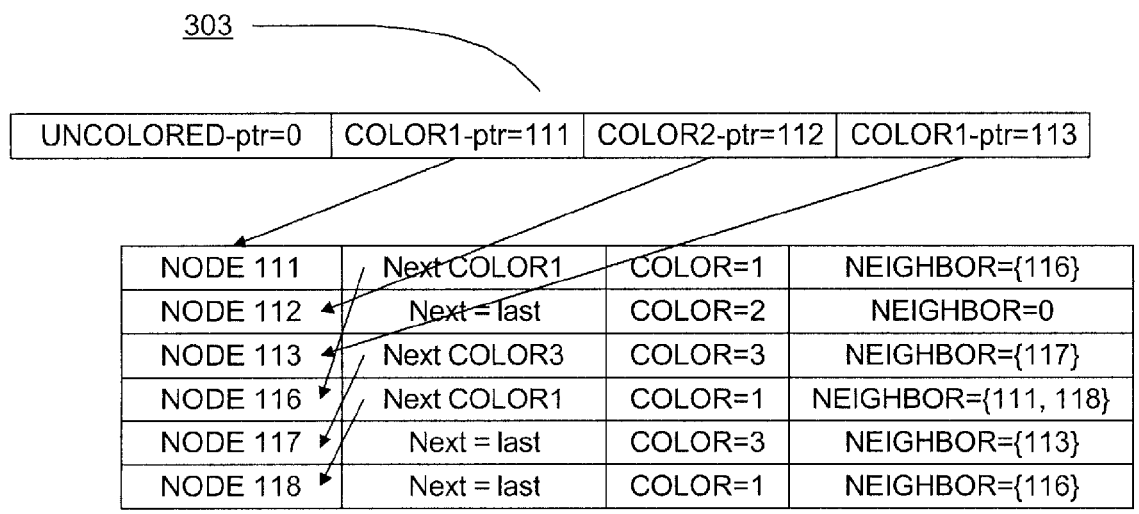
FIG. 3d shows a fourth version of an array of nodes to be generated by the exemplary method of FIG. 2.

In the third iteration of step 240, COLOR3 (e.g., blue) is selected. In step 260, COLOR3 is assigned to the first uncolored node, node 113. COLOR3 is then also assigned to node 117, as a neighbor of color 113, in step 270. The COLOR3 pointer is updated to point to node 113, and subsequently from node 113 to node 117. At this point, the discovery of the third (e.g., "blue") network fragment is completed. The uncolored pointer is eliminated, as no uncolored nodes remain. No changes take place in the ensuing loop including step 280, 290, 270 and 280, as all nodes have been colored. The method again returns to step 230, in which it is determined that no uncolored nodes remain, and the method terminates. FIG. 3d illustrates the array 303, which is the array 300 at the conclusion of the execution of the exemplary method 200.

The exemplary method 200 provides for a more rapid assessment of network fragmentation than prior methods. Step 210 may be accomplished on the order of O(N) time, where N is the number of backbone nodes in the network 100, as there are several fixed actions performed for each node. Step 220 may be completed in O(M) time, where M is the number of backbone links between backbone nodes in the network 100; as for step 210, there are a number of fixed actions taken per link. Finally, the iteration of the loop comprising steps 230-260 may be completed in O(N)+O(M) time. Each node is moved once from uncolored to one of the colored lists (e.g., as in steps 260 and 270). Subsequently, each node may be accessed again when all its neighbors are examined (e.g., as in steps 270 and 290). These activities may be accomplished in O(N) time based on the number of nodes. Furthermore, each node may be accessed again to see if the node is already colored (and possibly to color it) when it represents a neighbor node for the currently analyzed node (e.g., as in step 270). Examination and selective coloring of all pairs of neighbors in the network in step 270 may be accomplished in O(M) time based on the number of links since each surviving link will be accessed twice, first to inspect and possibly to color the second link endpoint when the first endpoint is being examined, and again to inspect and possibly to color the first link endpoint when the second endpoint is being examined. Total time for the loop is thus O(N) plus O(M) as stated above.

Adding all estimates, execution time for the exemplary method 200 is O(N)+O(M). Further, because in typical service provider networks the number of links M is usually much greater than the number of nodes N, the execution time may be expressed as simply O(M). In prior art methods, isolated network fragments may be determined by minimum spanning tree algorithms, such as Kruskal's, Prim's or Sollin's algorithms. These algorithms may typically complete in O(M log N) time, where, as above, M is the number of backbone links and N is the number of backbone nodes. It will be obvious to those of skill in the art that this execution time is larger than the execution time of the exemplary method 200 for any network of reasonable size.

By the application of the exemplary method 200, fragmentation of a damaged network may be assessed. Each group of backbone nodes represented by a single color or other unique identifier may represent a single isolated fragment of the network. As such, each node within a single group may communicate with every other node within the group, either directly or indirectly; nodes that are connected to one another by a single backbone link may be considered as connected directly, while nodes that are connected to each other through two or more backbone links and one or more intermediate backbone nodes may be considered as connected indirectly. Conversely, a node in one group may be incapable of communicating with nodes in other groups.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A non-transitory computer readable storage medium including a set of instructions executable by a processor, the instructions, when executed, causing the processor to:
   receive a node indication for each of a plurality of undamaged backbone nodes of a communication network;
   receive a link indication for each of a plurality of backbone links connected between undamaged backbone nodes of the communication network; and
   assign a unique fragment identifier to each of a plurality of backbone fragments, each of the backbone fragments comprising one or more of the backbone nodes, each of the backbone fragments being unable to communicate with the remaining backbone fragments due to a fragmentation of the communication network, wherein the one or more backbone nodes comprising each backbone fragment indicates connectivity between the one or more backbone nodes, each of the unique identifiers identifying the backbone nodes belonging to the corresponding backbone fragment and identifying the backbone fragments based on connectivity of backbone nodes within the backbone fragments,
   wherein to assign the fragment identifier to each of the plurality of backbone fragments, the instructions further cause the processor to,
   select one of the plurality of backbone nodes that has not been assigned one of the fragment identifiers, determine if a further one or more of the plurality of backbone nodes is a part of the same backbone fragment as the one of the nodes, assign, if a further one or more of the plurality of backbone nodes is a part of the same backbone fragment as the one of the nodes, a first fragment identifier to the node and to the further one or more nodes, and assign, if no further one or more of the plurality of backbone nodes is a part of the same backbone fragment as the one of the nodes, the first fragment identifier to the node.

2. The non-transitory computer readable storage medium of claim 1, wherein, to determine if the further one or more of the plurality of backbone nodes is a part of the same backbone fragment as the one of the nodes, the instructions further cause the processor to determine if at least one backbone link connects the backbone node to the further one or more of the backbone nodes.

3. The non-transitory computer readable storage medium of claim 2, wherein the set of instructions is repeated until all of the nodes have been assigned identifiers.

4. The non-transitory computer readable storage medium of claim 3, wherein the set of instructions is repeated for a plurality of fragmentations.

5. The non-transitory computer readable storage medium of claim 1, wherein the undamaged backbone nodes and undamaged backbone links correspond to a fragmentation is one of existing and hypothetical.

6. The non-transitory computer readable storage medium of claim 1, wherein the network is one of a voice over Internet protocol network, an IP data network, a communications network, a transportation network, a social network and an interactive gaming network.

7. The non-transitory computer readable storage medium of claim 1, wherein the identifiers are one of colors, numbers, letters, words, place names and network component designations.

8. The non-transitory computer readable storage medium of claim 1, wherein the instructions further cause the processor to:

indicate the fragment identifier for each of the backbone nodes.

9. A system, comprising:

a memory storing a representation of a plurality of network components, the network components including backbone components; and a processor configured to receive a fragmentation of the network components and to assign one of a plurality of unique identifiers to each of a plurality of fragments of the backbone corresponding to the fragmentation, each of the fragments being unable to communicate with the remaining fragments due to the fragmentation of the network components, each of the unique identifiers identifying the network components belonging to the corresponding fragment and identifying the fragments based on connectivity of network components within the fragments, wherein to assign the unique identifiers, the processor is further configured to select one of the plurality of backbone components that has not been assigned one of the fragment identifiers; determine if a further one or more of the plurality of backbone components is a part of the same backbone fragment as the one of the nodes; assign, if a further one or more of the plurality of backbone components is a part of the same backbone fragment as the one of the nodes, a first fragment identifier to the component and to the further one or more components; and assign, if no further one or more of the plurality of backbone components is a part of the same backbone fragment as the one of the components, the first fragment identifier to the component.

10. The system of claim 9, wherein, to determine if the further one or more of the plurality of backbone components is a part of the same backbone fragment as the one of the components, the instructions are further operable to determine if at least one backbone link connects the backbone components to the further one or more of the backbone components.

11. The system of claim 9, wherein the steps that the processor is configured to perform are repeated until all of the network components have been assigned identifiers.

12. The system of claim 11, wherein the steps that the processor is configured to perform are repeated for a plurality of fragmentations.

13. The system of claim 9, wherein the fragmentation is one of existing and hypothetical.

14. The system of claim 9, wherein the network components are elements of one of a voice over Internet protocol network, an IP data network, a communications network, a transportation network, a social network and an interactive gaming network.

15. The system of claim 9, wherein the identifiers are one of colors, numbers, letters, words, place names and network component designations.

16. The system of claim 9, wherein the processor is further configured to indicate the fragment identifier for each of the backbone components.

17. A non-transitory computer readable storage medium including a set of instructions executable by a processor, the instructions, when executed, cause a processor to:

receive a node indicator for each of a plurality of backbone nodes of a communication network;

receive a link indicator for each of a plurality of backbone links of a communication network, wherein the backbone links connect two or more backbone nodes;

receive a damage indication of one or more of the backbone nodes; and assign a unique fragment identifier to each of one or more undamaged backbone nodes in backbone fragments, each backbone fragment comprising undamaged backbone nodes that are connected, directly or indirectly, by backbone links, each of the backbone fragments being unable to communicate with the remaining backbone fragments due to a fragmentation of the communication network, each of the unique identifiers identifying the backbone nodes belonging to the corresponding backbone fragment and identifying the backbone fragments based on connectivity of backbone nodes within the backbone fragments, wherein, in assigning the unique fragment identifier, the instructions further cause the processor to, select one of the backbone nodes that has not been assigned a fragment identifier, determine if a further one or more of the backbone nodes is a part of the same backbone fragment as the one of the nodes, assign, if a further one or more of the backbone nodes is a part of the same backbone fragment as the one of the nodes, a first fragment identifier to the node and to the further one or more nodes, and assign, if no further one or more of the backbone nodes is a part of the same backbone fragment as the one of the nodes, the first fragment identifier to the node.

* * * * *